J. S. THOMPSON.
LOCKING DEVICE FOR SECURING AUTOMOBILE ROBES, OVERCOATS, AND THE LIKE.
APPLICATION FILED MAY 21, 1912.
1,042,502. Patented Oct. 29, 1912.
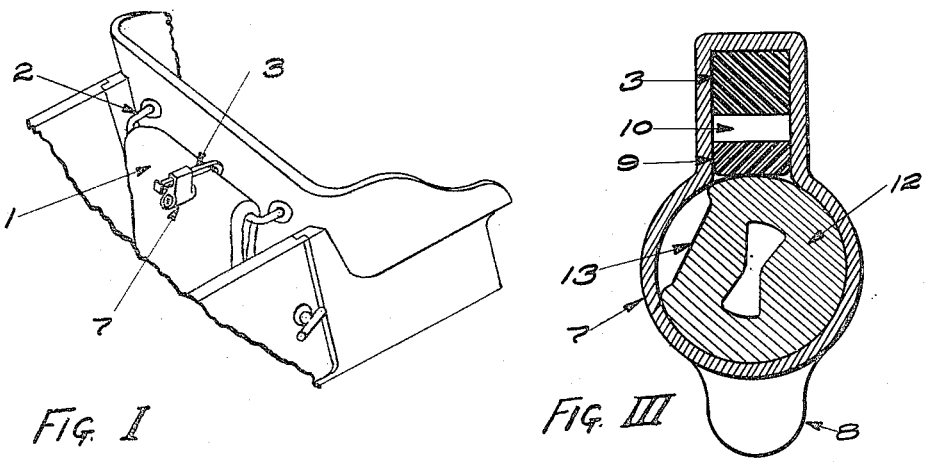
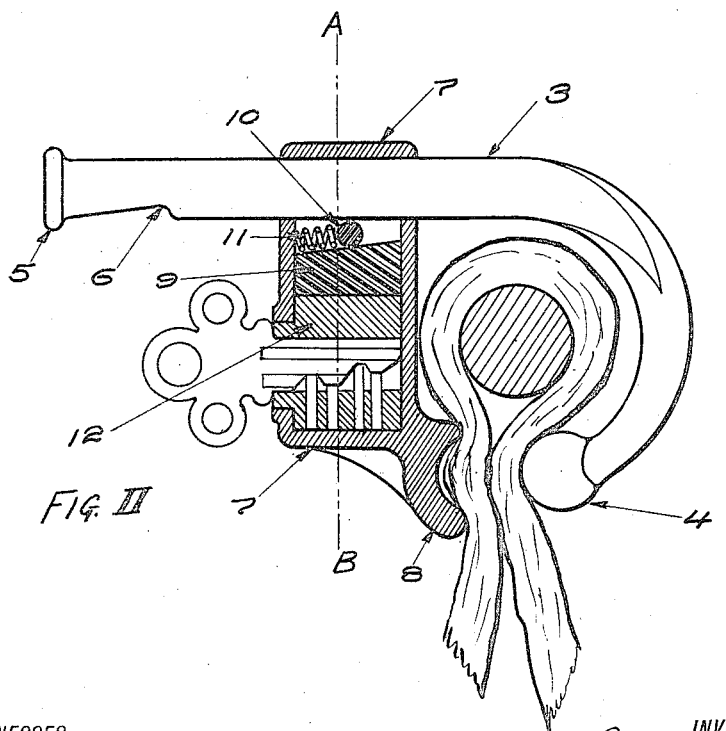
WITNESSES:
Estell Levy
Herman Geiger
INVENTOR
Joseph S. Thompson

UNITED STATES PATENT OFFICE.

JOSEPH S. THOMPSON, OF MILL VALLEY, CALIFORNIA.

LOCKING DEVICE FOR SECURING AUTOMOBILE-ROBES, OVERCOATS, AND THE LIKE.

1,042,502.  Specification of Letters Patent.  Patented Oct. 29, 1912.

Application filed May 21, 1912. Serial No. 698,777.

*To all whom it may concern:*

Be it known that I, JOSEPH S. THOMPSON, a citizen of the United States, residing in Mill Valley, in the county of Marin and State of California, have invented a new and useful Improvement in Locking Devices for Securing Automobile-Robes, Overcoats, and the Like, of which the following is a specification.

My invention consists of a locking mechanism and the object of my invention is to provide a means for securely fastening automobile robes on the robe rail of an automobile, so that they cannot be removed without unlocking and thereby freeing my device. I attain this object by the device illustrated in the accompanying drawing in which—

Figure I is a view of the locking device applied to an automobile robe 1, supported on an automobile robe rail 2, Fig. II is a side view of the device partly in section and Fig. III is an end section of the lock chamber.

Similar designating marks refer to similar parts throughout the several drawings.

Part 3 is a sliding arm with a curved ball shaped end 4 and with a stop head 5 and notch 6, and part 7 is a lock chamber with a cup shaped extension 8, set in line with the ball 4 of part 3.

In the lock chamber 7, a wedge 9 and roller 10 are so arranged that the spiral spring 11 forces the roller between the wedge and the sliding arm 3, so that the moving of the sliding arm, which would tend to separate the arm extension 4 and the chamber extension 8, would be checked by the wedgelike action of the roller 10, which would bind it against the upper portion of the chamber 7, the revolving barrel 12 preventing the wedge 9 from receding under the pressure of the roller 10. Should, however, a key be inserted in the barrel 12, rotating it to the position wherein the notch 13 would move under the wedge 9, said wedge will recede into the notch freeing the roller and making it possible to freely slide the arm 3 back and forth in the chamber 7. When it is required to lock the mechanism, the arm 3 is moved to its extreme outer position, when the notch 6 will permit the roller 10 to recede, freeing the wedge 9 so that the barrel 10 can readily be turned into the locking position by means of a key, after which the device can be clamped on the robes and robe rail by simply squeezing it together. It will therefore be seen that when this device is clamped, as shown in Fig. I and Fig. II, around an automobile robe and robe rail, it will be impossible to remove the robe without either cutting it or destroying the lock unless it is released by the use of the proper key.

What I claim is:—

In combination with a sliding arm, having a curved ball shaped end, a locking chamber, embracing said arm, and with a cup shaped extension to form a clamp, acting in conjunction with said arm and also embracing a lock, consisting of a roller, wedge and releasing barrel for locking said arm.

In witness whereof, I have hereunto set my hand this 16th day of May, 1912.

JOSEPH S. THOMPSON.

Witnesses:
HERMAN GEIGER,
ESTELLE LEVY.